United States Patent Office 3,132,142
Patented May 5, 1964

3,132,142
ISOCYANURATE COMPOUNDS
Thomas R. Hopkins, Shawnee Mission, Kans., assignor to Spencer Chemical Company, a corporation of Missouri
No Drawing. Filed Apr. 24, 1961, Ser. No. 104,845
3 Claims. (Cl. 260—248)

This invention relates to novel isocyanurate compounds. More particularly it relates to tri-substituted isocyanurate compounds having both allyl and 2,3-epoxypropyl substituents, the compounds specifically being allyl di(2,3-epoxpyropyl) isocyanurate and diallyl 2,3-epoxypropyl isocyanurate.

Allyl di(2,3-epoxypropyl) isocyanurate and diallyl 2,3-epoxypropyl isocyanurate are low melting solids having uncorrected melting points of 48–49° C. and about 38–39° C., respectively. They are relatively soluble in most common polar solvents such as methanol, diethyl ether, acetone, ethyl acetate, and the like.

The compounds can be conveniently formed by the peroxidation of triallyl isocyanurate. The triallyl isocyanurate is a known compound which can be prepared by the reaction of an allyl halide such as allyl chloride with trisodium cyanurate.

A convenient manner of carrying out the peroxidation of the triallyl isocyanurate compound is in general as follows: A reaction mixture of triallyl isocyanurate and not more than about an equimolar quantity of glacial acetic acid, containing a catalyzing amount of a strongly acidic cation exchange resin, for example, one of the sulfonic acid type, is heated to a reaction temperature. Hydrogen peroxide is added dropwise with stirring to the reaction mixture in an amount at least about equimolar to the allyl groups to be epoxidized. Hydrogen peroxide and the acetic acid react to form peracetic acid. After the addition, the reaction is continued maintaining a reaction temperature for an additional period of time sufficient to provide the desired completeness of the epoxidation. Usually about a one to ten-hour reaction period is adequate with about a two to five-hour period being adequate. The reaction mixture is cooled and filtered to remove the cationic resin and any unwanted precipitated reaction products. It has been found convenient to add the filtrate containing the epoxy isocyanurate product to one or two volumes of a dilute sodium chloride solution, for example, about a one percent solution. By this convenient expedient, the desired product is readily separated from the sodium chloride solution as the lower layer, effecting a degree of preliminary purification. The product layer is removed and is washed thoroughly as with further portions of dilute sodium chloride, a basic aqueous solution such as five percent sodium bicarbonate followed by washing with distilled water to remove the salts of the aqueous washes from the product.

The reaction products customarily contain both the allyl di(2,3-epoxypropyl) isocyanurate and diallyl 2,3-epoxypropyl isocyanurate compounds, which can be separated from each other by following conventional distillation procedures. The distillate fractions consisting of the two separate products are collected. The compounds are recrystallized, as from a lower alkanol such as methanol, and dried, as desired.

Considerable range can be employed as to reaction temperatures depending upon the acid catalyst, the concentrations of reactants, and the like, employed in the preparations. A reaction temperature in the range of about 40° C. to about 100° C. has been found suitable; the presently preferred reaction temperature range is about 55° C. to 75° C.

In the above described general reaction, peracetic acid formed in situ is the peroxidizing agent. Commercially available hydrogen peroxide products such as fifty percent or higher concentrations are suitable for the peracid formation. Use of those commercial products having the higher concentrations of hydrogen peroxide usually favors higher yields. Although the general method referred to is described with specific reference to peracetic acid as the peroxidation agent, other peracid agents both aryl and aliphatic in character can be employed. As with peracetic acid, they can be preformed or formed in situ.

It has been found advisable to employ an antioxidant in the reaction mixture prior to the distillation isolating procedures. Hydroquinone has been found useful to incorporate in the reaction medium to minimize free radical polymerization of the olefinic groups.

As the acid catalyst, it has been found suitable to employ common sulfonic acid cation exchange resins in the acid cycle. A sulfonic acid cation exchange resin of the sulfonated polystyrenedivinylbenzene type, such as marketed by Dow Chemical Company under the trademark "Dowex 50" has been found suitable. Other catalysts can be employed if desired and will be suggested by those skilled in the art.

The compounds of this invention have been found highly suitable for producing prepolymers which can later be cured with conventional curing agents to form thermoset polymers. The thermoset polymers derivable from the compounds are useful in forming molded parts, laminates, coatings, adhesives, and the like.

By the using of the monomer compounds as herein provided, it is possible to, e.g., homopolymerize the monomer by selective employment of a catalyst that will form preferably linear polymeric chains of the monomer. Then the linear prepolymer may be introduced to or be employed in lamination procedures and cured by employing a second and different catalyst, or curing agent, which will bring about linking of either the remaining epoxy or allyl groups, whichever was not utilized by the first catalyst in the prepolymer formation.

In order to bring about a homopolymer utilizing polymerization of the olefinic unsaturation of the allyl groups, it has been found suitable to employ a peroxide type catalyst which will decompose to provide its initiating action at a suitable temperature. For this purpose common peroxides such as peresters, peracids, and percarbonates have been found suitable. Satisfactory peroxide catalysts include t-butyl perbenzoate, dicumyl peroxide, benzoyl peroxide, and the like.

To bring about, on the other hand, the polymerization through the epoxy groups it has been found suitable to employ the catalyst boron trifluoride dietherate. For example, in the polymerization of the diallyl 2,3-epoxypropyl isocyanurate compound to form a prepolymer it has been satisfactory to employ about one to about five percent by weight of boron trifluoride dietherate, desirably about two percent by weight. Customarily the prepolymers prepared in accordance with the above descriptions will be viscous, transparent polymers which are adaptable for use in the conventional molding, laminating, and other procedures and practices of thermoset polymeric act.

The following examples are in further illustration of the compounds and processes of this invention but are not in limitation thereof except as defined by the appended claims.

EXAMPLE 1

*Preparation of Allyl Di(2,3-Epoxypropyl) Isocyanurate and Diallyl 2,3-Epoxypropyl Isocyanurate Compounds*

A mixture of 25 g. on a dry weight basis of Dowex 50–X8, 100 g. (0.4 mole) of triallyl isocyanurate, and 10 g. (0.17 mole) of glacial acetic acid is heated with stirring to 60° C. While maintaining a reaction temperature in the range of 60°–65° C., 27.2 g. (0.4 mole) of a commercial fifty percent hydrogen peroxide is added to the mixture dropwise with stirring at a controlled rate so as to maintain the reaction temperature in the 60°–65° C. range. After the addition, the reaction mixture is maintained with stirring for an additional 4.5 hours at a temperature of about 60°–65° C. The reaction mixture is then cooled and filtered into 100 ml. of a one percent aqueous sodium chloride solution. The reaction product containing the desired allyl di(2,3-epoxypropyl) isocyanurate and diallyl 2,3-epoxypropyl isocyanurate compounds forms the lower layer. The product layer is removed and is washed successively with 50 ml. portions of the one percent aqueous sodium chloride solution, five percent aqueous sodium bicarbonate, and two times with distilled water. After adding 5 mg. of hydroquinone to the washed product, it is dried at 100° C. under reduced pressure for one hour leaving a residue weighing 68 g.

The dried residue containing the desired allyl di(2,3-epoxypropyl) isocyanurate and diallyl 2,3-epoxypropyl isocyanurate products are further purified and separated by distillation providing a fraction distilling at 137° C. to 148° C. at a pressure of 0.2 mm. of mercury consisting of the diallyl 2,3-epoxypropyl isocyanurate compound.

The diallyl 2,3-epoxypropyl isocyanurate compound distillate fraction is recrystallized from ethanol and dried providing a crystalline solid melting at 38° C. to 39° C. *Analysis.*—Calculated for $C_{12}H_{15}N_3O_4$: C, 54.35; H, 5.66; N, 15.84; iodine number, 191.7. Found: C, 54.31; H, 5.64; N, 15.89; iodine number, 196.7.

A second distillate fraction is collected at 150° C. to 165° C. at a pressure of 0.2 mm. of mercury and is recrystallized from methanol to provide a crystalline product of the allyl di(2,3-epoxypropyl) isocyanurate compound, which after drying has a melting point of 48° C. to 49° C. *Analysis.*—Calculated for $C_{12}H_{15}N_3O_5$: C, 51.25; H, 5.34; N, 14.95; iodine number, 140.0. Found: C, 52.55; H, 5.28; N, 15.27; iodine number, 136.1.

EXAMPLE 2

*Formation of Prepolymer of the Diallyl 2,3-Epoxypropyl Isocyanurate Compound*

A quantity of 3 g. of the diallyl 2,3-epoxypropyl isocyanurate compound is melted and about 16 mg. of boron trifluoride dietherate as catalyst is thoroughly mixed with the melt. The melt mixture is maintained at about 40° C. with stirring for a two-hour period resulting in a highly viscous, clear prepolymer.

To the above prepolymer preparation is added with thorough mixing 2.5 percent by weight of t-butyl perbenzoate as a curing agent. The curing polymeric mixture is heated at 100° C. for thirty minutes, resulting in a cured polymer which is a hard infusible solid.

What is claimed is:

1. A compound selected from the group consisting of allyl di(2,3-epoxypropyl) isocyanurate and diallyl 2,3-epoxypropyl isocyanurate.
2. Allyl di(2,3-epoxypropyl) isocyanurate.
3. Diallyl 2,3-epoxypropyl isocyanurate.

References Cited in the file of this patent

UNITED STATES PATENTS

| | | |
|---|---|---|
| 2,765,296 | Strain | Oct. 2, 1956 |
| 2,809,942 | Cooke | Oct. 15, 1957 |
| 2,894,950 | Lloyd et al. | July 14, 1959 |
| 2,930,776 | Lundberg | Mar. 29, 1960 |
| 2,947,736 | Lundberg | Aug. 2, 1960 |
| 3,053,797 | D'Alelio | Sept. 11, 1962 |

FOREIGN PATENTS

| | | |
|---|---|---|
| 560,468 | Canada | July 15, 1958 |

OTHER REFERENCES

Du Pont Bulletin, Epoxidation and Hydroxylation, pages 3 to 4 (1955).